May 12, 1964     KAARE HANSEN ETAL     3,132,818
DEVICE FOR WINDING FILM STRIPS ONTO A PROCESSING SPOOL
Filed Jan. 15, 1962     2 Sheets-Sheet 1

Kaare Hansen and
Erling J. Knutsen
INVENTORS

BY Wenderoth, Lind
and Ponack,
attorneys

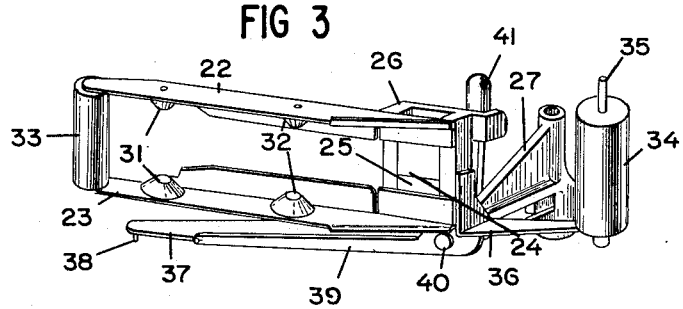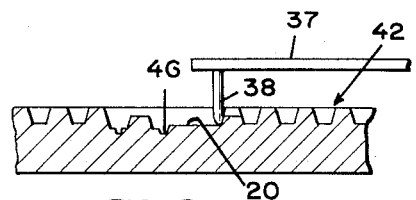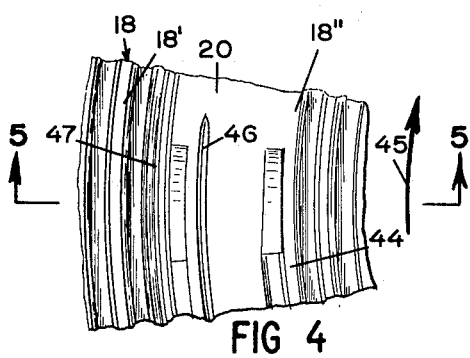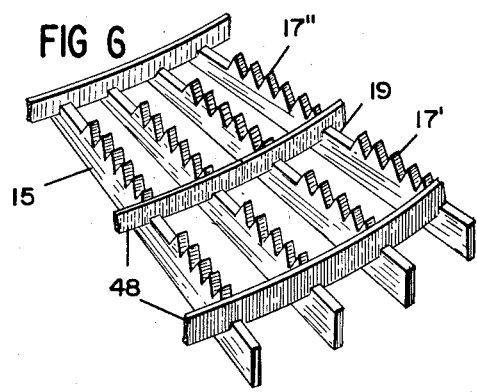

United States Patent Office 3,132,818
Patented May 12, 1964

3,132,818
DEVICE FOR WINDING FILM STRIPS ONTO A PROCESSING SPOOL
Kaare Hansen, Statens Skjermbildefotografering, Oslo, Norway, and Erling J. Knutsen, Storlokka, Honefoss, Norway
Filed Jan. 15, 1962, Ser. No. 166,201
Claims priority, application Netherlands Jan. 16, 1961
7 Claims. (Cl. 242—55)

The present invention relates to apparatus for winding photographic film strips to be processed in a spiral having spaced convolutions. More particularly, the invention relates to an improved form of a device of this type which was described in our prior patent, Ser. No. 2,990,128.

According to that patent a film holding reel or spool is used which has two coaxial flanges joined together by a central pin. Each of the flanges mainly consists of a number of radially extending spokes each of which is provided with a row of teeth. The position of the teeth on the spokes is such that they define a spiral track for the edge of the film strip which does not hold the strip along its whole length but is interrupted by the interspaces between the spokes. These interspaces provide for a nearly unobstructed passage of processing liquids and drying air towards the space between the film convolutions. For feeding the film strip into the spool the latter is rotatably supported and there is provided a movable film guide into which the leading end of the film can be inserted and which can be introduced between the spool flanges. In order to ensure a correct positioning of the film guide member during winding its movement is governed by a guide plate which is rotated together with the spool and has a spiral groove corresponding to the spiral tracks of the spool. A finger which is attached to the film guide follows the spiral groove of the guide plate and moves the film guide progressively outward as the winding proceeds.

Processing spools with either interrupted spiral tracks as described above or conventional continuous spiral tracks may also be used for the simultaneous treatment of several short film strips each occupying a limited number only of the spiral windings available. A winding device as described in our above-mentioned prior patent could be used for winding on such film strips successively. This procedure has certain disadvantages, however. To enable a next film strip to be inserted into the film guide the winding must be stopped for a while after the previous film strip has been finished. In the dark room, however, it will be very difficult to make sure exactly when the winding of a film strip has been completed. In practice, to be safe, the spool will have to make much more revolutions for each film strip than would be strictly required in view of the length of the strip, especially if the device is motor-driven. Therefore, the spool will hold only a few films. Moreover the winding of a number of short film strips with the aid of the winding device previously described will be a delicate and uncomfortable procedure requiring much attention.

It is the principal object of the invention to remedy these deficiencies and to provide a winding device of the type indicated which is especially suited for the purpose of winding a number of short film strips on a processing spool.

In accordance with the present invention the spiral groove in the guide plate is subdivided into a number of sections separated from each other by uninterrupted circumferentially closed outlet grooves and means are provided to urge the finger of the film guide member when it is in the outlet grooves against the groove wall which is nearest to the axis of the guide plate whereby the outlet grooves may be repetitiously traversed by the finger. Thus, after the finger has run through a section of the spiral groove and a film strip has been coiled on, the finger enters the outlet groove which separates the section traversed from the next one. With continued rotation of the guide plate the finger will be kept dragging, e.g. under the action of a spring, against the ridge of the outermost winding of the groove section traversed. This situation may last for several revolutions of the spool which may then be stopped in order to insert the next film strip.

By moving the film guide outward against the spring action until the finger in the outlet groove contacts the ridge of the first winding of the next section and thereupon turning the guide plate in the correct sense, the finger will automatically enter the next section of the groove.

In accordance with the invention the entrance of the finger into the next groove section is still facilitated if, at least, the first winding of such section is recessed into the bottom of the outlet groove which precedes the section. In this case the only action required is to move the film guide slightly outward till the finger snaps into the recessed winding and restart the rotation of the guide plate.

In a preferred embodiment of the invention the flanges of the processing spool have spiral grooves which are subdivided into a number of sections which are separated from each other by concentric rings attached to the flanges and projecting above the plane of the groove bottoms a distance substantially equal to the height of the ridges between adjacent windings of the spiral grooves. The purpose of the rings is to prevent the first part of a film strip being wound onto the spool from entering the section destined for the film strip previously coiled on and from so touching the latter strip. Such difficulties could arise from the fact that roll films which have been stiffly wound on a spool of small diameter exhibit a strong inclination to curl.

The invention will be described in greater detail hereinafter with reference to the accompanying drawings showing a preferred embodiment of the device according to the invention. In the drawings:

FIG. 3 is a perspective sketch of the film guide;

FIG. 4 shows a detail of the guide plate in top plan view;

FIG. 5 shows a cross-section along the line V—V of FIG. 4;

FIG. 6 shows a part of the processing spool in perspective.

Figure 2:
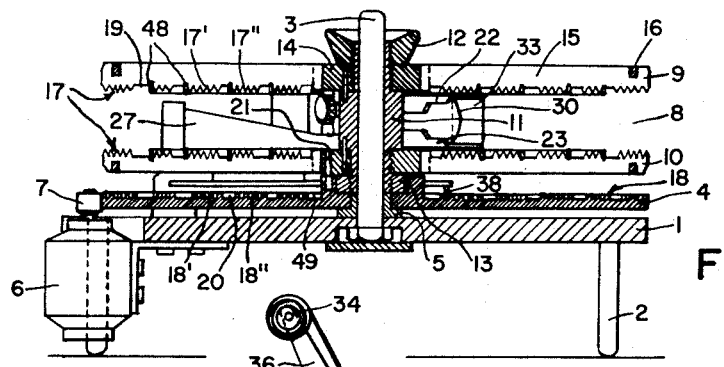
FIG. 2 shows a cross-section along the line II—II of FIG. 1.

The winding device illustrated has a base plate 1 disposed on legs 2. A shaft 3 is fixedly mounted on the plate. Immediately over the base plate a guide plate 4 is rotatably mounted on shaft 3 by means of a bearing 5. The guide plate has on its upper side a spiral groove 18. An electric motor 6 is supported by plate 1 whose shaft is provided with a roller 7 e.g. made of rubber. Roller 7 bears against the edge of circular guide plate 4 and drives the latter by friction. A processing reel or spool 8 is detachably mounted on shaft 3 and consists of two generally circular flanges 9 and 10 and a hollow central pin 11 forming the hub of the spool. The flanges and the central pin are joined together by a pair of nuts 12 and 13.

Each of the flanges has a central part 14 and a number of spokes 15 regularly spaced apart and extending radially from the hub. The spokes are held by a circular reinforcement rib 16 near the circumferential edge of the flange. Each of the spokes 15 is provided with toothing 17 on the side facing the other flange. The teeth are divided along spokes 15 into groups 17', 17" etc. which are separated from each other by interspaces 19. Corresponding groups of teeth on all spokes of a flange together define an interrupted spiral groove adapted to retain an edge of a photographic film strip in the desired spiral with spaced convolutions. This spiral has the same pitch as the spiral groove 18 in the guide plate 4. Spool 8 and plate 4 can not be turned relative to each other since a pin 21 prevents this.

Figure 1:
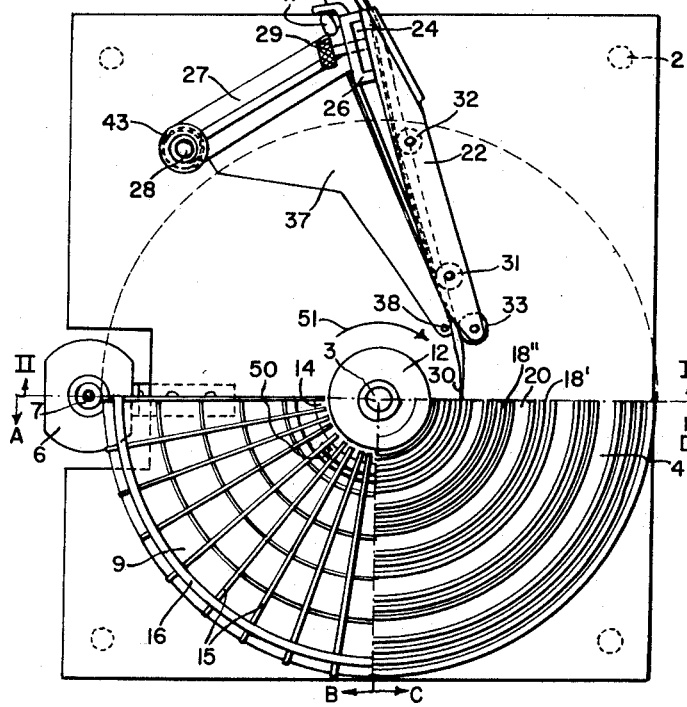
FIG. 1 is a schematic top plan view of the improved winding device.

In FIG. 1 only a quarter part of spool 8 is shown, viz. the sector A—B. Furthermore a sector C—D of the guide plate 4 is shown in top plan view in FIG. 1. The remaining parts have been omitted in order to show more clearly the film guide member through which film strips 30 are introduced into the spool.

This member, as may best be seen in FIGS. 1 and 3, has two elongated sheet metal strips 22 and 23 which have been bent laterally to an L-shaped cross-section. The strips are fastened to small blocks 24 and 25, resp., which fit in the groove of a U-shaped member 26 carried by an arm 27 which is rotatably supported by a shaft 28 mounted on base plate 1. Strips 22 and 23 together define a guiding channel for the film strip 30 the height of which is adjustable by sliding block 24 in groove member 26 and fixing it at the desired height by means of screw 29 (see FIG. 1). The distance between the strips 22 and 23 should be such that the film guide can be swung in between the flanges 9 and 10 of spool 8. Due to this a film strip 30 when positioned in the guiding channel will be bent transversely as illustrated in FIG. 2. In order to retain the film strip between the strips 22 and 23 conical rollers 31 and 32 are provided. Moreover, at the outlet of the guiding channel a cylindrical roller 33 is mounted between the strips 22 and 23 which engages the convex side of the film. A film strip to be coiled on is disposed as a roll 34 on a spindle 35 carried by an arm 36.

When spool 8 is rotated the film guide is positively controlled by the guide plate 4. To accomplish this the film guide member is provided with an arm 37, made of sheet metal, which tapers towards its free end and is fixed to the swaying arm 27. A small finger 38 adapted to run in groove 18 of the guide plate is mounted on the free end of arm 37. During the winding arm 37 extends in the space between the lower flange 10 of the spool and the guide plate 4. Finger 38 is substantially vertically under the place where film strip 30 leaves the guiding channel and is, during assembly, adjusted so that the edges of film strip 30 when leaving the guiding channel are tangential to the right winding of the grooves in the spool flanges.

Arm 37 which is made of resilient material can be bent slightly by means of a rigid L-shaped lever 39 rotatably supported at 40 by the block 26. Finger 38 may be disengaged from the spiral groove 18 by pushing the vertical arm 41 of lever 39 a little backwards. With the finger in raised position the film guide may be swung into and out of the spool independently of the guide plate 4.

In the device known heretofore the guide plate 4 has one long spiral groove occupying the whole useful surface of the plate 4. Contrary to this, the guiding groove 18 of the present invention is subdivided into a number of sections 18', 18" etc., each substantially corresponding in length to the film strips to be treated. These sections are separated from each other by uninterrupted circumferentially closed circular outlet grooves 20 which, in the example shown, are substantially wider than the windings of the spiral groove. As shown in FIGS. 4 and 5 the bottom of the outlet groove 20 is below the upper surface 42 of the ridges separating adjacent windings of the groove 18. As illustrated, the bottoms of outlet groove 20 and guiding groove 18 suitably are on the same level.

The film guide member is provided with a spiral spring 43 schematically indicated in FIG. 1, which is placed around shaft 28 and tends to turn arm 27 clockwise. Thus, finger 38 is held under light pressure against that wall of the groove which is nearest to shaft 3. After having left groove section 18" at the point 44 (FIG. 4) and with continued rotation of plate 4 in the direction of arrow 45, finger 38 will be dragging against the ridge between the last winding of spiral 18" and the outlet groove 20. In this situation the position of the film guide does not change any more.

When the film guide member is turned a little anti-clockwise against the action of spring 43, however, finger 38 will automatically snap into a spiral groove 46 which is provided over at least one winding as a recess in the bottom of the outlet groove 20. Groove 46 may be considered as a first or inlet winding of the next section 18' of the spiral groove which does not get its normal shape until the point 47. At that point the groove 46 becomes gradually more shallow so that finger 38 can enter groove 18' without any jamming or damaging.

FIG. 6 shows a detail of a flange of the processing spool. Recessed parts 19 interrupt the toothing 17 of the spokes in such a manner that the interrupted spiral track formed by the teeth is subdivided into sections 17', 17" etc. similar to the sections of the spiral groove 18 in the guide plate 4. The sections are separated by circular recessed zones. Generally, the number of teeth in each section will vary along the spokes since a certain length of film will require less windings the nearer the section is situated to the circumference. The several sections are not only separated by the recesses 19 but also by thin erect rings 48 the height of which is about equal to that of the toothing 17. Thus, the rings 48 do not obstruct the movement of the film guide between the spool flanges but effectively prevent the film from snapping into a previous section of the spiral tracks which could endanger the proper winding and development of the film strip concerned.

The use of the device is as follows. When a number of film strips have to be wound upon the processing spool the first film roll 34 is put on pin 35 of the film guide member. The free end of the film is introduced into the guiding channel defined by the strips 22 and 23. As the width of this channel is smaller than the film width the film strip will be curved transversely. After that the guiding channel is moved inwards between the spool flanges so far as to allow finger 38 to be lowered into the circular groove 49 (see FIG. 2). By turning the guide member a little anti-clockwise finger 38 will snap into an inlet groove (not shown) of the first section of the spiral groove 18 which is recessed in the bottom of groove 49 similarly to the groove 46 in FIG. 5. Then the film is transported a certain length by hand. The film strip 30 will straighten again upon leaving the guiding channel due to its inherent resilience and will snap between the teeth of the spokes 15 of spool 8. When the leading end of the strip has been introduced by hand so far that it occupies e.g. a semi-circle on the spool the friction between the spool and the edges of the film strip will generally be sufficient to permit starting of the motor 6 which will drive the spool in the direction of arrow 51. In order to obtain a firm anchorage of the film to the spool the end of the strip may be folded so as to form a flap 50 (see FIG. 1) engaging a tooth on each of the flanges 9 and 10. Under the control of the guide plate 4 the guide member now moves outwards so that the film strip 30 upon leaving the guiding channel enters the right tooth interspaces.

When the first film strip has been coiled on and finger 38 has left the first section of spiral groove 18 rotation of the device can be continued for some time without any objection. After the motor has been stopped a second film strip is introduced into the film guide and the latter is moved again a small angle anti-clockwise to permit finger 38 to snap into the recessed inlet groove of the second groove section. The film strip is transported by hand until it sticks and the motor is restarted. This procedure is repeated until, eventually, all sections of the spool are occupied. Finally, the film guide member is swung out to clear the spool 8 and the latter may be taken from the shaft 3 in order to be processed in the conventional manner.

What we claim is:

1. A device for winding photographic film strips to be processed comprising a spool having two flanges coaxially disposed, a central pin joining said flanges, each flange having a spiral groove to engage an edge of the film strips to retain said film strips in said spiral grooves, means for rotating said spool about the axis of said central pin, a movable film guide member for introducing a film strip between said spool flanges, a guide plate, means for rotating said guide plate with said spool, said guide plate having a spiral groove corresponding to said spiral grooves of said spool flanges, said film guide member comprising a finger to follow said spiral groove in said guide plate to control the position of said film guide member during winding, said spiral groove in said guide plate being subdivided into a number of sections separated from each other by uninterrupted circumferentially closed outlet grooves, and means to urge said finger when in said outlet grooves against the groove wall nearest to the axis of said guide plate whereby said outlet grooves may be repetitiously traversed by said finger.

2. A device for winding photographic film strips to be processed comprising a spool having two flanges coaxially disposed, a central pin joining said flanges, each flange having a spiral groove to engage an edge of the film strips to retain said film strips in said spiral grooves, means for rotating said spool about the axis of said central pin, said spiral grooves of said flanges being each subdivided into a number of sections, adjacent sections being separated from each other by concentric rings attached to said flanges and projecting above the plane of the groove bottoms a distance substantially equal to the height of the ridges between adjacent windings of the spiral groove, a movable film guide member for introducing a film strip between said spool flanges, a guide plate, means for rotating said guide plate with said spool, said guide plate having a spiral groove corresponding to said spiral grooves of said spool flanges, said film guide member comprising a finger to follow said spiral groove in said guide plate to control the position of said film guide member during winding, said spiral groove in said guide plate being subdivided into a number of sections separated from each other by uninterrupted circumferentially closed outlet grooves, and means to urge said finger when in said outlet grooves against the groove wall nearest to the axis of said guide plate whereby said outlet grooves may be repetitiously traversed by said finger.

3. A device as claimed in claim 2, wherein at least the first winding of a section of said spiral groove in said guide plate is recessed into the bottom of the outlet groove preceding said section.

4. A processing spool for use in a film winding device comprising two coaxially spaced flanges, a central pin connecting said flanges, each of said flanges having a spiral groove to engage an edge of a film strip to retain said film strip in said spiral groove, said spiral grooves of said flanges being each subdivided into a number of sections, adjacent sections being separated from each other by concentric rings attached to said flanges and projecting above the plane of the groove bottoms a distance substantially equal to the height of the ridges between adjacent windings of the spiral groove.

5. A processing spool for use in a film winding device comprising a central pin, a plurality of radially extending spoke members in both ends of said pin and fixedly attached thereto, each of said spoke members being provided on its inner face with a row of teeth, corresponding teeth of adjacent spoke members being radially displaced relative to each other whereby the interspaces of said teeth on said spoke members define interrupted spiral grooves for both edges of a film, said spiral grooves of said spoke members being each subdivided into a number of sections, adjacent sections being separated from each other by concentric rings attached to said spoke members and projecting above the plane of the groove bottoms a distance substantially equal to the height of the ridges between adjacent windings of the spiral groove.

6. A film guiding means for photographic film strips to be processed comprising a movable film guide member, a guide plate, means for rotating said guide plate, said guide plate having a spiral groove therein, a finger upon said guide member to follow said spiral groove in said guide plate to control the position of said film guide member, said spiral groove in said guide plate being subdivided into a number of sections separated from each other by uninterrupted circumferential closed outlet grooves, and means to urge said finger when in said outlet grooves against the groove wall nearest to the axis of said guide plate whereby said outlet grooves may be repetitiously traversed by said finger.

7. A film guiding means as claimed in claim 6 wherein at least the first winding of a section of said spiral groove in said guide plate is recessed into the bottom of the outlet groove preceding said section.

References Cited in the file of this patent

UNITED STATES PATENTS 2,990,128    Hansen et al. _____ June 27, 1961